Jan. 12, 1926.  1,569,664
E. C. MOGFORD
DIFFERENTIAL CARRIER FOR MOTOR VEHICLES
Filed March 9, 1922      2 Sheets-Sheet 2

Patented Jan. 12, 1926.

1,569,664

UNITED STATES PATENT OFFICE.

EDMUND C. MOGFORD, OF BUCHANAN, MICHIGAN, ASSIGNOR TO CLARK EQUIPMENT COMPANY, OF BUCHANAN, MICHIGAN, A CORPORATION OF MICHIGAN.

DIFFERENTIAL CARRIER FOR MOTOR VEHICLES.

Application filed March 9, 1922. Serial No. 542,296.

*To all whom it may concern:*

Be it known that I, EDMUND C. MOGFORD, a citizen of the United States, and a resident of Buchanan, in the county of Berrien and State of Michigan, have invented certain new and useful Improvements in Differential Carriers for Motor Vehicles, of which the following is a specification, reference being had to the accompanying drawings.

My invention relates to motor vehicles of the type having differential gearing associated with the rear axle. In such vehicles the rear axle comprises two alined members which at their inner ends are connected with the differential gearing and at their outer ends have a driving connection with the rear wheels, and the object of my invention is to provide improved means for supporting the parts of the differential gearing and also the inner ends of the axle members so that they will be capable of resisting the strains to which they are subjected without getting out of alinement, thereby avoiding danger of cramping or binding in the differential gearing. I accomplish this object as illustrated in the drawings and hereinafter described. What I regard as new is set forth in the claims.

In the accompanying drawings,—

Figure 1:
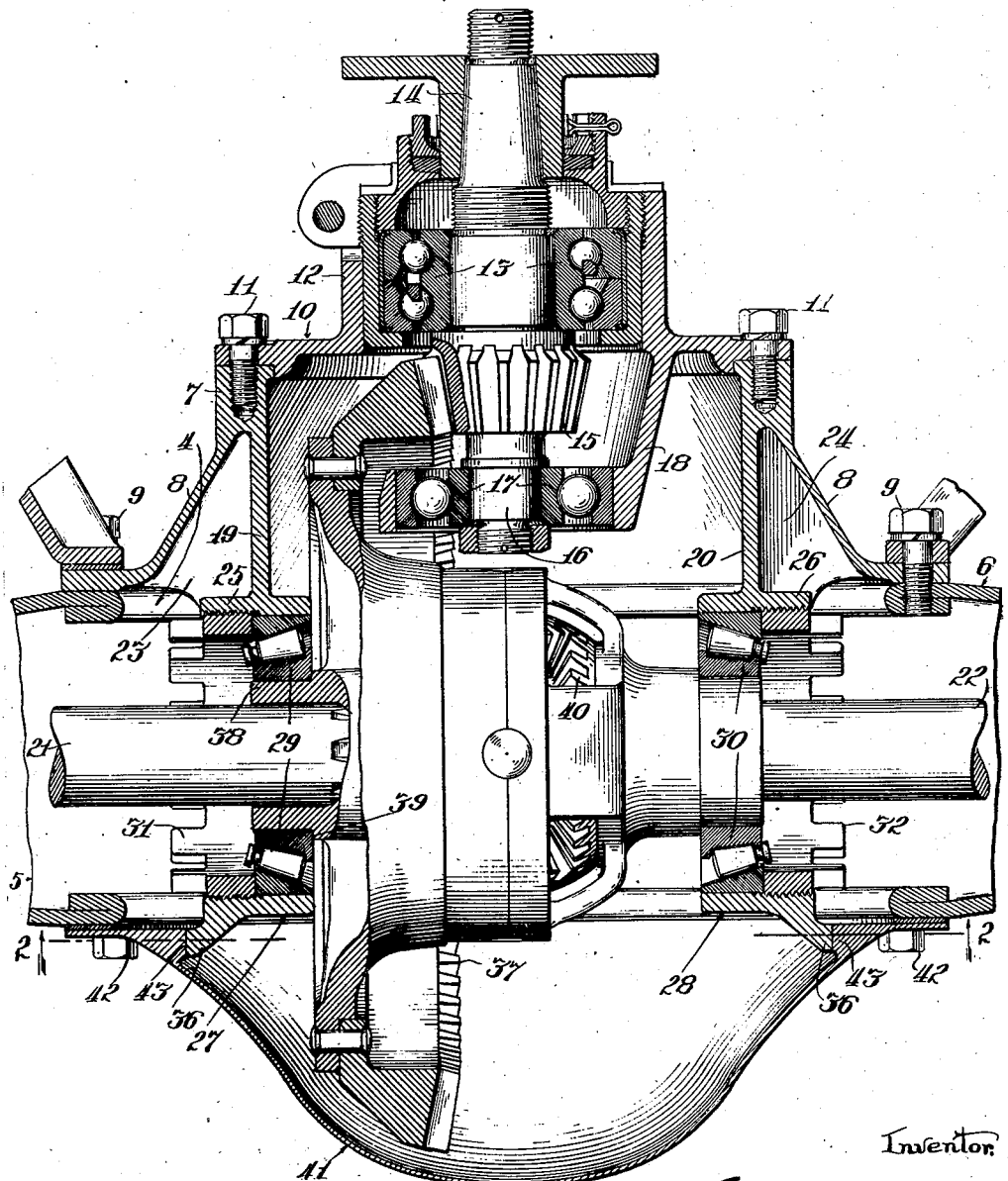
Fig. 1 is a horizontal sectional view of the central portion of a rear axle of the type referred to, some parts being in elevation.
Figure 2:
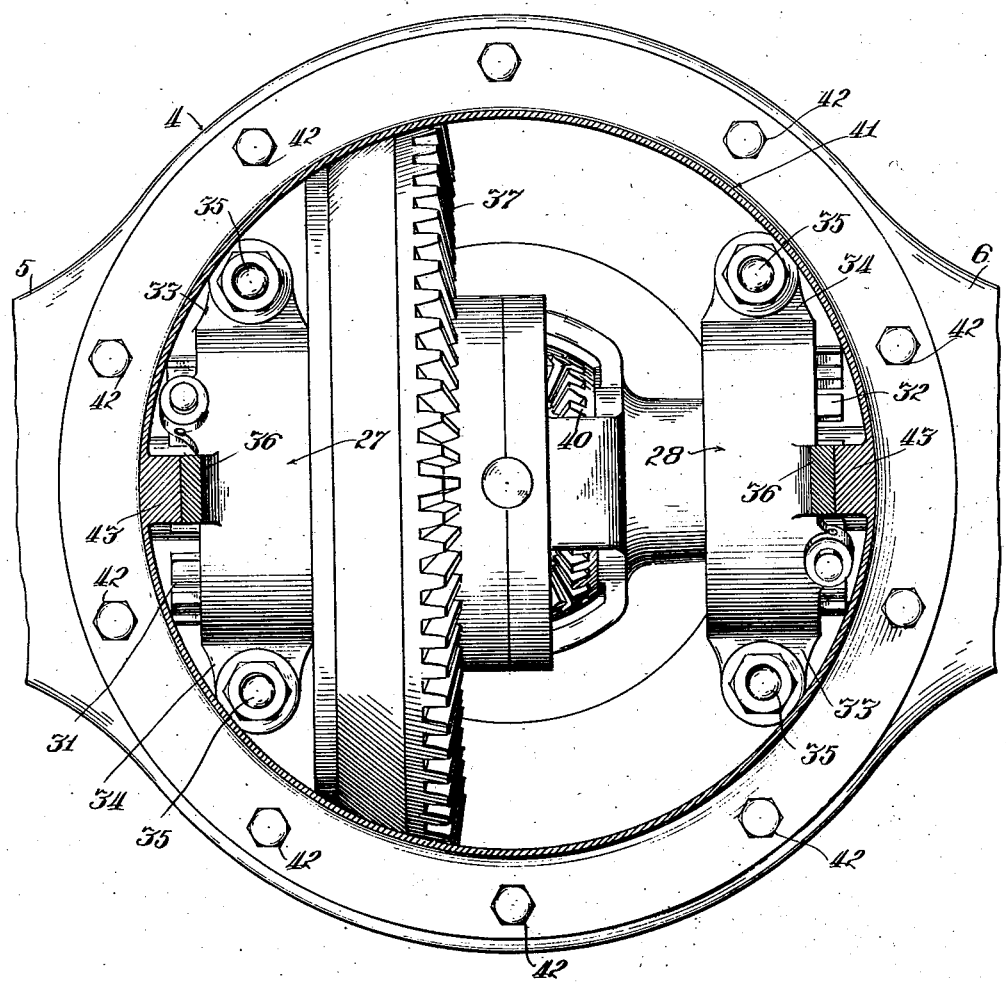
Fig. 2 is a vertical section on line 2—2 of Fig. 1.

Referring to the drawings,—4 indicates a member which forms the intermediate portion of the differential carrier or housing, the central portion of which is circular as shown in Fig. 2. This member is provided at opposite sides with tubular members 5, 6 which form housings through which the rear axle members extend. At the front side of the intermediate member 4 is secured a head 7 comprising a conical plate 8 which fits snugly against the forward face of said intermediate member, and is secured thereto by bolts 9 as shown in Fig. 1, thus enclosing that side of the differential housing. The head 7 is also provided with a removable plate 10 secured by bolts 11, which plate is provided with an outwardly-projecting sleeve 12 in which is fitted an anti-friction bearing 13. In this bearing is mounted the usual stub propeller shaft 14 at the inner end portion of which is a driving pinion 15. The propeller shaft 14 extends inwardly beyond the pinion 15 for a short distance as shown at 16 in Fig. 1, and is mounted in an anti-friction bearing 17 fitted in an inwardly-extending bracket 18 carried by the plate 10.

Figure 3:
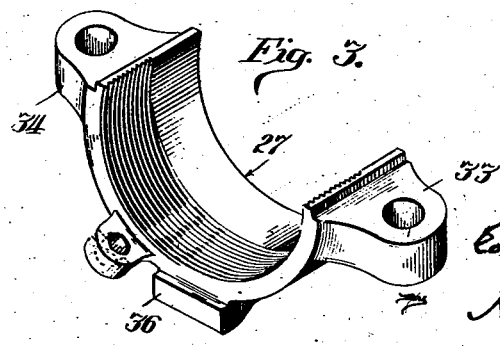
Fig. 3 is a perspective view of one of the yokes by which the anti-friction bearings are secured and supported.

At opposite sides of the head 7 are two inwardly-projecting webs 19, 20 which are perpendicularly disposed with reference to the axle members 21, 22 and are reenforced by webs 23, 24 connecting with the plate 8, so that the webs 19, 20 are strongly braced. At their inner ends these webs 19, 20 carry semi-cylindrical members or yokes 25, 26, the outer end portions of which are internally screw-threaded as shown in Fig. 1. 27, 28 indicate semi-cylindrical members or yokes which are adapted to fit and be secured to the straight marginal portions of the members 25, 26 to form cylindrical supports in the form of collars in which the anti-friction bearings 29, 30 are mounted. The outer portions of the yokes 27, 28 are also internally screw-threaded to conform to the screw threads of the members 25, 26, respectively, so that when said parts are fitted together they are adapted to receive annular locking collars 31, 32, which are screwed into them so as to bear against the anti-friction bearings 29, 30, as shown in Fig. 1. As shown in Fig. 3, the yokes 27, 28 are provided at opposite sides with lugs 33, 34 which register with corresponding lugs carried by the members 25, 26 so that said members may be secured together by bolts 35 passing through the registering lugs of each pair.

The yokes 27, 28 are also provided with abutments 36 which are located centrally at their outer margins. Said abutments project downward and outward and have bearing faces disposed radially with reference to the longitudinal axis of the differential, as best shown in Figs. 1 and 3. The purpose of these abutments will be hereinafter pointed out.

37 indicates the main driving gear of the differential mechanism, which meshes with the pinion 15, as shown in Fig. 1. This driving gear is provided with a tubular hub 38 which fits in the anti-friction bearing 29 and is provided with a shoulder 39 against which the inner margin of said anti-friction bearing abuts, so that said anti-friction bearing is held firmly in place between said shoulder and the locking collar 31. The hub 38 is adapted to receive the inner end of the axle member 21 which extends loosely through it and has interlocking engagement with the usual beveled pinion mounted on its inner end. The axle member 22 is provided at its inner end with a similar pinion 40 disposed oppositely to the pinion carried by the axle member 21, and these two pinions intermesh with the usual radially-disposed beveled pinions carried by the usual differential case with which the main driving gear 37 is fixedly connected. Consequently rotation of the main driving gear 37 causes the radially-disposed beveled pinions to revolve about the axis of the axle members 21, 22, thereby causing said axle members to rotate, the usual differential movement of the axle members being permitted by reason of the geared connection thereof with said radially-disposed pinions. This is a common type of differential gearing and is not claimed as my invention.

41 indicates a cover plate for the differential housing which is fitted against the rear side of the intermediate member 4 and is secured thereto by bolts 42. This cover plate is provided at diametrically opposite points adjacent to its margin with abutments 43 also having bearing faces disposed radially and adapted to register with and bear laterally, i. e. lengthwise of the axle, against the bearing faces of the abutments 36 of the yokes 27, 28, as shown in Figs. 1 and 2. By this construction, inasmuch as the cover plate 41 is firmly secured to the intermediate member 4 of the differential housing, the abutments 36, 43 serve to brace the yokes 27, 28, against lateral movement and, consequently, the anti-friction bearings 29, 30 are firmly supported so that they resist the strains to which they are subjected in the operation of the vehicle, and, therefore, hold the parts of the differential gearing in proper relation to each other and prevent the cramping or binding which would otherwise ensue. The cover plate 41 may be readily removed by taking out the bolts 42, thereby exposing the bolts 35 and making it an easy matter to remove the yokes 27, 28 when necessary. This also permits the easy removal of the head 8 so that access to the differential may easily be had. As the cover plate has no connection with the yokes 27, 28, the construction of these parts is simplified, and the necessity of providing bolt holes or otherwise fashioning the cover plate so as to support bolts for securing the yokes in place is avoided, thus not only simplifying their construction, but also making it practicable to make the intermediate portion of the cover plate of much lighter material. The removal of the cover plate is also facilitated, as it is necessary only to remove one set of bolts instead of two, as would be required if the yokes were secured to the cover plate. What I claim as my invention and desire to secure by Letters Patent, is—

1. A differential housing for motor vehicles comprising an intermediate member, a head secured to the front side thereof, a cover plate secured to the rear side of said intermediate member, a bearing supporting member connected with said head, and a cooperating bearing supporting member adapted to be secured to said first-mentioned bearing supporting member and having a fixed abutment provided with a radially disposed bearing face arranged to bear laterally against said cover plate.

2. A differential housing for motor vehicles comprising an intermediate member, a head secured to the front side thereof, a cover plate secured to the rear side of said intermediate member and having an abutment provided with a radially disposed bearing face adjacent to its inner margin, a bearing supporting member connected with said head, and a cooperating bearing supporting member adapted to be connected with said first-mentioned bearing supporting member and having a fixed abutment provided with a radially disposed bearing face arranged to bear laterally against the abutment on said cover plate.

3. A differential housing for motor vehicles comprising an intermediate member, a head secured to the front side thereof, a cover plate secured to the rear side of said intermediate member, a bearing supporting member connected with said head, and a second bearing supporting member adapted to cooperate with said first-mentioned bearing supporting member and to bear laterally against said cover plate adjacent to the margin thereof, said cover plate and the second bearing supporting member being disconnected from each other.

EDMUND C. MOGFORD.